United States Patent Office 3,271,148
Patented Sept. 6, 1966

3,271,148
MORDANTING OF ACID DYES
Keith E. Whitmore, Rochester, N.Y., assignor to Eastman Kodak Company, Rochester, N.Y., a corporation of New Jersey
No Drawing. Filed July 19, 1962, Ser. No. 211,095
22 Claims. (Cl. 96—29)

This invention relates to dye mordanting layers and more particularly, to dye mordanting layers useful either integral with or contiguous to photographic color elements.

Mordanting, and thus immobilizing, soluble dyes in hydrophilic polymeric colloids such as gelatin, which are commonly employed as the film-forming colloids in photographic materials, is commonly accomplished by causing the dyes to enter into a salt-forming reaction with (1) ionic groups in the principal film-forming colloid, (2) ionic groups in a compatible polymer admixed in minor proportion with the colloid, or (3) ionic groups in nonpolymeric compounds admixed with the colloid.

However, a sufficient concentration of ionic mordanting groups in the film-forming polymer or in a polymer added for mordanting purposes may adversely modify the properties of the colloid. In addition, since it is virtually impossible to prepare polymers of uniform molecular weight, dye-mordanting polymers usually contain some low molecular weight material which can cause trouble by diffusing laterally within the layer or by migrating into an adjacent layer. This is particularly serious when the dye is being deposited as a pattern or image.

Nonpolymeric mordant compounds offer some obvious advantages. Compounds of this type, having a uniform composition, are easier to prepare and purify than polymeric mordants, and changes in structure and in concentration can be made without modifying the chemistry of the polymeric ingredients of the layer. However, nonpolymeric mordants also present difficulties. Not only are the physical, chemical, and photographic properties of the colloid frequently affected adversely by the salt-forming groups, but hydrophobic ballast groups of such mordant compounds to reduce its diffusibility in the hydrophilic colloid vehicle decrease compatibility with the colloid so that it is difficult to prepare a stable, homogeneous dispersion. Furthermore, the combination of a hydrophobic ballast group and a salt-forming group often imparts surfactant and emulsifying properties to the mordant so that excess mordant may emulsify the contiguous mordanted dye and cause it to deteriorate and to wander.

It is an object of this invention to provide novel dye-mordanting layers in which are utilized the advantages, but which overcome the shortcomings, of nonpolymeric ionic mordants.

It is another object of our invention to provide a new hydrophilic film-forming colloid containing at least one cationic, organic, nonpolymeric stabilized and immobilized mordant for acid dyes.

It is another object of the invention to provide new photographic dye mordanting compositions.

It is another object of the invention to provide a new photographic element having at least one dye-mordanting layer comprising a hydrophilic polymer containing a nonpolymeric cationic mordant.

It is another object of the invention to provide a novel receiving element for acid dyes.

It is another object of the invention to prepare by a novel process mordanted dye images of improved color characteristics and stability to light and heat.

It is still another object of this invention to provide a novel photographic color diffusion transfer process.

These and other objects of the invention are accomplished with mordanting compositions comprising at least one hydrophilic organic colloid containing a finely-divided, uniform dispersion of droplets or globules of a high-boiling, water-immiscible, organic solvent in which is dissolved a high concentration of a cationic, nonpolymeric, organic dye-mordanting compound for acid dyes.

Such mordanting compositions have particular utility in the photographic art and can be directly coated on a photographic support to serve as a dye receiving sheet, or as an overlayer or interlayer on photographic elements, or added to photographic emulsion layers. The mordanting compositions of the invention are especially useful for preparing elements for receiving and mordanting diffusible acid dye images in photographic color diffusion transfer processes.

Incorporating the nonpolymeric organic cationic mordants in layers according to our invention results in (1) reducing diffusibility of the mordanting compound and of the mordanted dye, (2) increasing the stability to light and heat of the mordanted dye, (3) insulating the mordant to render it physically, chemically, and photographically inert to materials outside the droplets, and (4) improvement in the density of the mordanted dye images.

The mordant utilized in practicing the invention can be widely varied. The choice of the mordant is generally dictated by practical considerations familiar to those skilled in the art, e.g., expediency in preparation of the compound, solubility in organic solvent, types of dyes used, absorption of the dye-mordant salt, types of hydrophilic colloid used, light fastness of the dyes used, and the like.

The nonpolymeric organic mordant compounds useful in our invention have cationic groups which are capable of entering into salt-forming reactions, e.g., a quaternary ammonium group and at least one hydrophobic group, which inhibits wandering, e.g., a long chain aliphatic group. Such cationic mordant compounds are well-known to those skilled in the art and can be either water soluble or water insoluble.

Basic or cationic mordant compounds useful in the dye-mordanting compositions of our invention for immobilizing soluble acid dyes, include quaternary ammonium and phosphonium, and ternary sulfonium compounds in which there is linked to the N, P, or S, onium atom at least one hydrophobic ballast group, such as long chain alkyl or substituted alkyl groups. The onium atom can be part of an open chain or of a heterocyclic ring and there can be more than one onium atom in the molecule.

Typical cationic mordants which are useful in our invention include the following compounds which are referred to hereinafter by number as indicated:

TABLE I.—CATIONIC MORDANT COMPOUNDS

No.:
(1) Octadecyltri-n-butylammonium bromide.
(2) Tetradecyltri-n-butylammonium bromide.
(3) Octadecyltri-n-octylammonium bromide.
(4) Octadecyltri-n-decylammonium bromide.
(5) Methyltri-n-laurylammonium p-toluenesulfonate.
(6) Methyltri-n-decylammonium p-toluenesulfonate.
(7) Tetra-n-octylammonium bromide.
(8) Tetra-n-decylammonium bromide.
(9) Tetra-n-laurylammonium bromide.
(10) N,N-dimethyl-N-($\beta$-hydroxyethyl)-N-($\gamma$-stearamidopropyl) ammonium dihydrogen phosphate.
(11) N,N-dimethyl-N-($\beta$-hydroxyethyl)-N-($\gamma$-stearoyloxypropyl) ammonium chloride.
(12) N,N-dimethyl-N-($\beta$-hydroxyethyl)-N-(p-tert-octylphenoxydiethoxyethyl)-ammonium methosulfonate.
(13) N,N-dimethyl-N-($\beta$-hydroxyethyl)-N-(p-tert-octylphenoxytetraethoxyethyl)-ammonium methosulfonate.

TABLE I.—Continued

(14) N,N-dimethyl-N-(β-hydroxyethyl)-N-(N-methyl-γ-stearamidopropyl) ammonium bromide.
(15) Cetyltrimethylammonium bromide.
(16) 17,17,20,20,31,31,34,34-octamethyl-17,20,31,34-tetrazapentacontaniumtetrabromide.
(17) 1,4-dihexadecyl-1,4,-diazabicyclo[2.2.2]octanium dichloride.
(18) 1,4-didodecyl-1,4-diazabicyclo[2.2.2]octanium p-toluene sulfonate.
(19) 1,4-bis[γ-(2,4-di-tert-amylphenoxy)butyl]-1,4-diazabicyclo [2.2.2]octanium chloride.
(20) 1,4-di-n-hexadecyl-1,4-diazabicyclo[2.2.2]octanium dithiocyanate.
(21) 1,4-di-n-decyl-1,4-diazabicyclo[2.2.2]octanium perchlorate.
(22) 1,10-decamethylenebis(4-lauryl-1,4-diazabicyclo[2.2.2]octanium) tetrabromide.
(23) n-Octadecyltri-n-butylphosphonium bromide.
(24) n-Hexadecyltriphenylphosphonium bromide.
(25) 5,5,7,7-tetramethyl-2-octenyltri-n-butylphosphonium chloride.
(26) 1-(3,5-dioxo-6-oxa-4-aza)tetracosyltri-n-butylphosphonium bromide.
(27) 1,1-dimethyl-1-(n-hexadecyl)hydrazonium perchlorate.
(28) 1,1-dimethyl-1-(γ-stearamidopropyl)hydrazonium chloride.
(29) N-cetyl-N-ethylmorpholinium p-ethosulfate.
(30) N-methyl-N-myristyloxymethylmorpholinium p-toluenesulfonate.
(31) 1,4-dimethyl-1,4-di-n-laurylpiperazinium dibromide.
(32) S-n-butyl-S-methyl-S-n-octadecylsulfonium p-toluenesulfonate.
(33) S-ethyl-S-methyl-S-(γ-stearoyloxypropyl)sulfonium p-toluenesulfonate.
(34) S,S-di-n-lauryl-S-methylsulfonium thiocyanate.
(35) N,N-dimethyl-N-(β-dimethylaminoethyl)-N-(n-hexadecyl) ammonium bromide.
(36) Hexadecyltri-n-butylphosphonium bromide.
(37) N-dodecyl-N-methylmorpholinium chloride.
(38) N-methyl-N-octadecyloxymethylmorpholinium p-toluenesulfonate.
(39) Methyltri-n-laurylammonium chloride.
(40) n-Octadecyl-dimethyl-β-hydroxyethyl ammonium bromide.
(41) Sec.-butyl-1,4-diazabicyclo[2.2.2]octanium dibromide.
(42) N-cyclohexyl-N,N-dimethyl-N-(dodecylthiomethyl) ammonium-p-toluene sulfonate.

A wide variety of cationic mordant compounds are useful in the invention including organic quaternary phosphonium salts, organic ternary sulfonium salts and such organic quaternary ammonium salts as morpholinium salts, piperazinium salts, tetraammonium salts, 1,4-diazabicyclo[2.2.2]octanium salts and the like. Illustrative of such cationic mordant compounds are

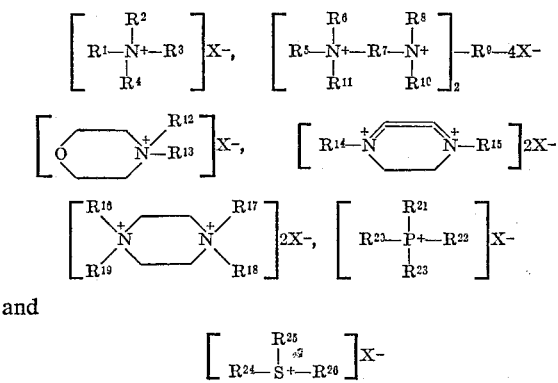

and

In the above formulas: $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{23}$, $R^{24}$ and $R^{25}$ are alkyl radicals; $R^{15}$ is an alkyl radical or a hydrogen atom; $R^3$, $R^4$, $R^{12}$, $R^{13}$, $R^{23}$ and $R^{26}$ are alkyl radicals, substituted alkyl radicals such as alkylamidoalkyl, acyloxyalkyl, alkylphenoxyalkoxyalkyl, alkoxyalkyl, alkylthioalkyl, dialkylaminoalkyl, hydroxyalkyl, and the like, or a cyclohexyl radical; $R^3$ or $R^4$ can also be amino radicals; $R^7$ and $R^9$ are alkylene radicals; X is an acid anion such as $Br^-$, $Cl^-$, $I^-$, $CNS^-$, p-toluenesulfonate, and the like. At least one of the substituents on each mordant compound contains a radical having at least 8 carbon atoms for ballasting purposes. Alkyl and alkylene radicals in the above formulas generally have from 1 to 22 carbon atoms.

The subject mordant compounds can be utilized either alone or in combinations of more than one mordant. Particularly useful combinations of mordants are Compounds 1+5, 1+16, 1+17, 5+23, 5+29, 10+17, 29+34 and others.

The term "nonpolymeric" used herein with reference to the present mordant compounds means that the cation of the basic mordant does not have regularly recurring units containing the cationic group beyond the dimer structure. However, the ballast group attached to the quaternary or ternary atom of the cation group can contain repeating groups, such as tetraethoxy, polymethylene, etc.

The mordant compounds useful in the invention can be readily prepared.

The N,N-dialkyl - N - (β-hydroxyalkyl)-N-(γ-alkylamidoalkyl) ammonium compounds can be made by reacting a fatty acid with a dialkylaminoalkylamine to form the corresponding amide, which is quaternized with an ethylene halohydrin to form the corresponding quaternized salt.

Tetralkylammonium and phosphonium salts can be made by reacting an alkyl halide with a trialkylamine or phosphine.

Alkyl tetraquaternaryammonium salts, e.g., Compound 16, Table I, can be made by reacting 1 mole of tetralkyl alkylenediamine with 1 mole of alkyl halide and then quaternizing by adding one-half mole of alkyl halide to the resulting product.

The diazabicyclo [2.2.2] octanium compounds can be prepared by the procedure described by Oae et al., J. Org. Chem., 24, 1348 (1959).

Quaternary hydrazonium compounds can be prepared by reacting a trialkylamine with chloramine to form the hydrazonium chloride.

Ternary sulfonium salts can be prepared according to the methods described on page 200 of "Surface Active Agents," A. M. Schwartz, J. W. Perry, volume I (1949).

The N,N-dialkylmorpholinium chlorides can be prepared by the methods described in Erickson U.S. Patents 2,694,707 and 2,694,708, issued November 16, 1954, by reacting secondary amines with bis (2-chloroethyl) ether.

The solvent or carrier for the ionic, nonpolymeric mordant compound in the dispersed phase is a high-boiling, water-immiscible, organic liquid having a boiling point above about 175° C. The high-boiling solvent can be used alone in forming the dispersion, or it can be admixed with some low-boiling organic solvent, i.e., boiling at least about 25° C. below the boiling point of the higher-boiling solvent, or a water-soluble organic solvent, as an auxiliary solvent to facilitate the solution of the mordant material. Preferred ranges of proportions of high-boiling solvent to auxiliary solvent are ⅕ to ⅒ on a weight basis.

Any of the high-boiling, water-immiscible, crystalloidal solvents described on page 2, col. 2 and page 3, col. 1 of U.S. Patent 2,322,027, issued June 15, 1943, can be used. Particularly useful solvents are organic carboxylic acid esters and organic phosphate esters. Typical solvents include di-n-butyl-phthalate, benzyl phthalate, ethyl benzyl malonate, tetrahydrofurfuryl succinate, triphenyl phosphate, tri-o-cresyl phosphate, diphenyl mono-p-tertbutyl phenyl phosphate, monophenyl di-o-chlorophenyl phosphate, tri-p-tert-butylphenyl phosphate, 2,4-di-n-amylphenol, and the like.

Typical low-boiling or water-soluble organic auxiliary solvents include, (1) Substantially water-insoluble low-boiling solvents such as ethyl and butyl acetates, ethyl propionate, butyl alcohol, ethyl formate, nitroethane, chloroform, etc., and (2) Water-soluble solvents, such as methyl isobutyl ketone, $\beta$-ethoxy ethyl acetate, $\beta$-butoxy-$\beta$-ethoxy ethyl acetate, tetrahydrofurfuryl adipate, diethylene glycol monoacetate, $\beta$-methoxymethyl acetate, acetonyl acetone, diacetone alcohol, diethylene glycol monomethyl ether, ethylene glycol, dipropylene glycol, acetone, ethanol, acetonitrile, dimethylformamide, dioxane, etc.

The low-boiling or water-soluble solvent can be removed from the dispersion, for example, by air drying a chilled, noodled dispersion, or by continuous water washing.

The hydrophilic polymers useful in our invention as protective colloids include gelatin and its water-soluble derivatives, polyvinyl alcohol, its water-soluble derivatives and copolymers, water-soluble vinyl polymers, such as polyacrylamide, imidized polyacrylamide, etc., and other water-soluble film-forming materials that form water-permeable coatings, such as colloidal albumin, water-soluble cellulose derivatives like ethanolamine cellulose acetate, etc. Compatible mixtures of two or more colloids can be used. Gelatin is preferred.

In preparing dye mordanting compositions of the invention, the mordant is dissolved in a solvent described above and mixed with an aqueous solution of a hydrophilic colloid. While the amount of solvent utilized to dissolve the mordant compound can be widely varied, we prefer to utilize proportions of mordant compound to high-boiling solvent in the range of about 1/.25 to 1/2 on a weight basis. The resulting oil-in-water emulsion is then emulsified or homogenized until the mordant dissolved in the solvent is substantially uniformly dispersed in finely-divided droplets, the droplets suitably being less than about 5 microns in size, more generally less than about 2 microns in size, and oftentimes in the range of about .5 to less than about 5 microns in size. Small amounts of surfactant compounds can be utilized as dispersants in preparing the solvent dispersions in the hydrophilic colloid if desired. Suitable surfactants include sodium diisopropylnaphthalene sulfonate, sodium laurylsulfonate, p-tert-octylphenoxy diethoxy sulfonate sodium salt, sodium N-methyl-N-oleyl taurate, diisobutylcresoxyethoxyethyl, dimethyl, benzylammonium chloride, diisobutylphenoxyethoxyethyl, dimethyl, benzylammonium chloride and the like.

The mordanting compositions of the invention can be coated on a wide variety of supports including such photographic supports as paper, and films of cellulose acetate, polystyrene, polyethylene terephthalate, and the like.

The mordant layers of our invention are useful in color diffusion transfer processes such as dye transfer processes in which dyes are imbibed into gelatin relief matrices and subsequently transferred from these matrices by diffusion into mordanted receiving layers brought into contact, such a process being described in "Kodak Dye Transfer Process," Kodak Publication No. E–80 of Eastman Kodak Company, Rochester, New York.

The mordant layers of our invention are useful for immobilizing and stabilizing the dye images produced in multicolor diffusion transfer processes, for example, Belgian Patents 578,470, granted November 6, 1959; 585,686, granted June 15, 1960 and 603,747, granted May 31, 1961. In these processes there are produced subtractively colored images composed of diffusable acid dyes which are formed from nondiffusible couplers at the site of silver development. These acid dyes transfer by diffusion to a contiguous layer containing a cationic mordant.

The mordant compositions of our invention can also be used for immobilizing and stabilizing diffusible dye images in processes, such as described in British Patent 804,971, issued November 26, 1958, and Belgian Patent 607,420, granted August 15, 1961. These processes utilize "dye developers" which are weak acid dyes also containing in the molecule a developing function. They become immobilized by oxidation at sites of silver development, the residual unoxidized dye developer transferring to a receiving layer containing a cationic mordant.

The mordant compositions of our invention may also be used in hydrophilic colloid layers of a photographic element to mordant, for example, antihalation and filter dyes.

A wide variety of water-soluble acid dyes can be mordanted with the mordanting compositions of the invention. Water-soluble acid dyes are well known materials to those skilled in the art. Such dyes contain acid groups, for example, carboxylic, sulfonic, ionizable sulfonamido and hydroxy substituted aromatic or heterocyclic groups which lend to the dyes negative charges. Such anionic dyes can be readily immobilized by means of the cationic mordant compounds in the mordanting compositions of the invention.

The following examples further illustrate preferred embodiments of the invention.

*Example I.—Preparation of mordant-dispersions of the invention*

The cationic mordants listed in Table I above were dissolved in water-immiscible solvents and dispersed in aqueous gelatin solution as described below. A 0.5 gram portion of mordant was dissolved in 0.5 cc. of di-n-butyl phthalate and 3 cc. of ethyl alcohol by heating the mixture to the reflux temperature of the mixture. The resulting solution was emulsified by mixing it with agitation in a solution of 22 cc. of 10% aqueous gelatin solution containing 2 cc. of 5% aqueous solution of the surfactant, sodium diisopropylnaphthalene sulfonate. The resulting oil-in-water emulsion was passed through a colloid mill five times to more finely disperse the suspended droplets of mordanted solution, and was then chilled to gel the composition, substantially all of the droplets being less than 2 microns in size. The resulting gel was cut up and dried to remove the water and alcohol leaving the mordant highly concentrated in the water-immiscible solvent droplets substantially uniformly distributed through the composition. The resulting mordanting compositions can be dried to facilitate storage if desired.

*Example II.—Preparation of photographic elements containing mordant-dispersions*

Coatings containing mordant-solvent compositions using the mordants listed in Table I above and prepared according to Example I, were made. Two grams of the dry mordanting compositions described in Example I were redispersed by adding to 21 cc. of water and 1.5 cc. of 7.5% saponin solution and heating with stirring at 40° C. The dispersions were then coated on subbed cellulose acetate film supports at a wet thickness of 0.009 inch and dried.

*Example III.—Soluble acid dyes fixed to coatings containing mordant-dispersions of the invention and the improved stability of the mordanted dyes*

The cationic mordant coatings prepared as described in Example II above were used as receiving sheets in the image transfer color process described in Whitmore et al. German Patent 1,095,115, published December 16, 1960. The soluble acid dyes from the couplers were mordanted in these receiving sheets. Each of these couplers, i.e., I–IV below, was incorporated into separate single-layer gelatin silver bromoiodide coatings containing 90 mg./ft.$^2$ of coupler, 100 mg./ft.$^2$ of silver, and 300 mg./ft.$^2$ of gelatin. Samples of these coatings were exposed and developed for 5 minutes at 75° C. in contact with the prepared receiving sheets of the invention with a color developer solution having the following composition:

Benzyl alcohol, cc. _____ 10.0
Ascorbic acid, g. _____ 0.2
Potassium bromide, g. _____ 0.7
Sodium carbonate·1H$_2$O, g. _____ 20.0
Sodium hydroxide, g. _____ 2.0
4-amino-N-ethyl-N (β-hydroxyethyl) aniline, g. ____ 10.0
Water to make one liter.

The soluble acid dyes formed during the development by the reaction of the couplers with the oxidized developing agent were transferred to and mordanted in the receiving sheets.

COUPLERS

I. 2-(3,5-disulfobenzamido)-4-(3-octadecylcarbamyl-phenylthio)-5-methyl phenol dispotassium salt. (Cyan dye-forming coupler)

II. 1-phenyl-3(3,5-disulfobenzamido)-4-(2-hydroxy-4-pentadecylphenylazo)-5-pyrazolone dipotassium salt. (Magenta dye-forming coupler)

III. α-Benzoyl-α-(3-octadecylcarbamylphenylthio)-3,5-dicarboxyacetanilide. (Yellow dye-forming coupler)

IV. 1-hydroxy-4-(3-octadecylcarbamylphenylthio)-N-ethyl-3',5'-dicarboxy-2-naphthanilide. (Cyan dye-forming coupler)

The resulting mordanted dye images were subjected to 30 hours xenon arc exposure. Other samples were heated for 7 days at 140° F. and 75% relative humidity. The mordanted dye images were found to have good density and good stability to heat and light. Table II below compares the stability to light and heat of dye images mordanted according to our invention (referred to as Method A below) to similar dye images mordanted to the same cationic compounds dispersed directly in the gelatin coating. These latter were prepared according to the method of Example I except that the water-immiscible organic solvent was replaced with water (referred to as Method B below).

TABLE II

| Mordant No. (Table I) | Coupler Used | Wavelength of Maximum Absorption of the Dye (λ max.) in mμ | Percent Improvement in Light Stability of Mordanted Dye Images at λ max. by Using Method A Compared to Method B After 30 Hours' Xenon Arc Exposure | Percent Improvement in Heat Stability of Mordanted Dye Images at λ max. by Using Method A Compared to Method B After 1 Week at 140° F. and 75% R.H. |
|---|---|---|---|---|
| 10 | I | 645 | 92 | 69 |
| 10 | II | 540 | 17 | 44 |
| 10 | III | 435 | 45 | 62 |
| 2 | II | 540 | 59 | 56 |
| 2 | IV | 640 | 13 | 49 |
| 30 | II | 540 | 4 | 23 |
| 30 | III | 435 | 5 | 64 |
| 38 | II | 540 | 9 | 35 |
| 38 | III | 435 | 34 | 52 |
| 38 | IV | 640 | 36 | 28 |
| 12 | II | 540 | 29 | 15 |
| 12 | III | 435 | 12 | 34 |
| 12 | IV | 640 | 21 | 25 |
| 23 | II | 540 | 53 | 26 |
| 23 | IV | 640 | 6 | 47 |
| 33 | II | 540 | 48 | 3 |
| 33 | III | 435 | 14 | 2 |
| 33 | IV | 640 | 25 | 4 |

As can be observed from the data set out in Table II, mordanting compositions of the invention prepared with the mordant compound dispersed in a high-boiling solvent can be used to prepare mordanted dye images of significantly improved stability to light and heat than can mordanting compositions prepared with the mordant compound dispersed in water in accordance with usual practice.

*Example IV.—Comparison of mordant dispersions of the invention to direct gelatin dispersions*

A receiving sheet was made according to Example I and II (Method A) using Compound #15 of Table I, and a second receiving sheet was made using the same compound by incorporating it directly into an aqueous gelatin solution according to the method described in Example III (Method B). Dye images, obtained from Couplers I–IV described in Example III and with developing agent 4-amino-N-(β-hydroxyethyl)aniline sulfate, in the manner of Example III, were transferred to each of the prepared mordant receiving sheets, and the resulting mordanted dye images were subjected to the light and heat stability tests described in Example III. Dyes mordanted to Compound 15, incorporated by Method B, underwent substantial loss of dye density whereas the dye images mordanted to the same compound incorporated by Method A (our invention) were substantially more stable to light and heat. Also, Compound 15 was diffusible enough when incorporated by Method B that it wandered into the printing matrix and reacted with the dye there to form an effective barrier to the passage of further dye, that is "to poison" the matrix. This undesirable effect did not occur when Compound 15 was incorporated by the method of our invention.

*Example V.—Preparation of coatings of the invention containing a mixture of compatible cationic mordants*

Receiving sheets were made according to Examples I and II, using the following mixtures of cationic mordants of Table I.

(1) 0.25 g. Compound 17 and 0.25 g. Compound 1
(2) 0.33 g. Compound 10 and 0.17 g. Compound 17
(3) 0.17 g. Compound 1 and 0.33 g. Compound 23
(4) 0.25 g. Compound 29 and 0.25 g. Compound 34
(5) 0.25 g. Compound 5 and 0.25 g. Compound 29
(6) 0.33 g. Compound 5 and 0.17 g. Compound 23
(7) 0.33 g. Compound 1 and 0.17 g. Compound 5
(8) 0.17 g. Compound 1 and 0.33 g. Compound 16

Samples of the mixed mordant receiving sheets prepared above were used to mordant soluble acid dyes obtained from Couplers II, III, and IV as described in Example III. Other samples of the mixed mordant receiving sheets were used as the receiving sheets to mordant soluble dye developers in the process described in Example I of Weyerts et al. U.S. patent application Serial No. 50,932, now abandoned, filed August 22, 1960, corresponding to Belgian patent 607,420, granted August 15, 1961. The resulting dye images gave good color and density and showed good stability to light and heat.

*Example VI.—Filter dye layers containing mordant compositions of our invention*

This example shows the use of our mordant solvent gelatin dispersion compositions in filter dye layers. A photographic element was prepared using a cellulose acetate film support on which was coated a red-sensitized gelatin silver bromiodide emulsion containing the cyan dye-forming coupler, 2-[α-(2,4-di-tert-amylphenoxy)butyramido]-4,6-dichloro-5-methylphenol. Over the red-sensitive emulsion was coated a green-sensitized gelatin silver bromiodide emulsion containing a magenta dye-forming coupler, 1-(p-tert-butylphenoxyphenyl)-3-[α-(p-tert-butylphenoxy) propionamido]-5-pyrazolone. Over the green-sensitized layer was coated a gelatin layer containing tartrazine, a yellow filter dye, mordanted to Compound 17, Table I, incorporated by the dispersion method as described in Example II. Over the filter layer was coated a blue-sensitized gelatin silver bromiodide emulsion layer containing a yellow-dye forming coupler, α-benzoyl-5-[α-(2,4 - di - tert - amylphenoxy)acetamido]2 - methoxyacetanilide. All the above silver bromiodide emulsion layers were gold and sulfur sensitized. The multilayer coating was processed to a color positive by the process described in column 11 of Beavers et al. U.S. Patent 2,944,898, issued July 12, 1960. During color development, the yellow filter dye was removed, leaving the residual mordant in a photographically inactive condition in the solvent dispersion filter layer.

*Example VII.—Use of an integral mordant layer in a multilayer image transfer coating*

This is an example of the use of an integral mordant receiving layer containing the mordant-solvent composition of our invention in a sensitive element containing silver halide emulsion layers and color couplers to fix in said element the soluble dye images formed by color development. A multilayer color element was prepared having the following order of layers coated on a paper support:

(1) A gelatin mordant layer containing Compound 17 (Table I) incorporated as described in Example II above.

(2) A stripping layer of cellulose ether phthalate.

(3) A fogged gelatin silver halide emulsion layer containing the magenta dye-forming coupler, 1-phenyl-3-(3,5-disulfobenzamido) - 4 - (4 - octadecyloxyphenylazo) - 5 - pyrazolone.

(4) A green-sensitized gelatin silver halide emulsion layer containing the development inhibitor-releasing compound, 1-hydroxy-4-(2-nitrophenylthio)-N-[α-(2,4-di-tert-amylphenoxy)butyl]-2-naphthamide.

(5) A fogged gelatin silver halide emulsion layer containing the cyan dye-forming coupler, 2-(3,5-disulfobenzamido)-5-methyl-4-(4-octadecyloxyphenylazo)phenol, dipotassium salt.

(6) A red-sensitized gelatin silver halide emulsion layer containing the development inhibitor-releasing compound of layer 4.

(7) A gelatin filter layer containing yellow colloidal silver.

(8) A fogged gelatin silver halide emulsion layer containing the yellow dye-forming coupler, 1-hydroxy-4-{4-[3 - methyl - 4 - (1,5 - disulfo - 3 - naphthylazo) - 1 - pyrazol-5-onyl] phenylazo}-N-[δ-(3-pentadecylphenoxy)butyl]-2-naphthamide, dipotassium salt.

(9) A top gelatin silver halide emulsion layer containing the development inhibitor-releasing compound of layer 4.

The above photographic element was exposed to an image and developed for 3 minutes at 70° F. in a developing solution of the following composition:

Sodium carbonate (anhydrous), g. _____ 20
Sodium hexametaphosphate, g. _____ 2
Benzyl alcohol, cc. _____ 10
4 - amino - N - ethyl - N - (β - hydroxyethyl) aniline sulfate, g. _____ 2
Water to make one liter.

The soluble dye images, formed in the silver halide layers, diffused into the integral mordant layer which was then stripped from the emulsion layers to yield a print having mordanted dye images of good density and good stability to light and heat.

*Example VIII.—Photographic emulsion layers containing mordant compositions of the invention*

This is an example of the use of incorporated coupler silver halide emulsion layers containing the mordant compositions of our invention in a multilayer element in order to increase the stability of dye images formed by color development in said element. A multilayer color element having the folowing order of layers were coated on a suitably subbed cellulose acetate support:

(1) A red-sensitized gelatin silver halide emulsion layer containing the cyan dye-forming coupler 2-[α-(2,4-tert-amylphenoxy)acetamido] - 4,6 - dichloro - 5 - methylphenol, tri-o-cresyl phosphate, and Compound 21, Table I, incorporated as described in Example II above.

(2) A gelatin interlayer.

(3) A green-sensitized gelatin-silver halide emulsion layer containing the magenta soluble dye-forming coupler, 1 - phenyl - 3 - (3,5 - dicarboxybenzamido) - 4 - (3 - octadecylcarbamylphenylthio)-5-pyrazolone.

(4) A gelatin filter layer containing yellow colloidal silver.

(5) A blue-sensitized gelatin silver halide emulsion layer containing the yellow dye-forming coupler, α-{3-[α-(2,4 - di - tert - amylphenoxy)acetamido]benzoyl} - 2-methoxyacetanilide tri-o-cresylphosphate, and Compound 21, Table I, incorporated as described in Example II above.

The prepared photographic element was exposed to an image and developed for 10 minutes at 70° F. in a developing solution having the following composition:

G.
Sodium sulfite (anhydrous) _____ 2
Sodium carbonate (anhydrous) _____ 20
Potassium bromide _____ 1
4-amino-N,N-diethyl-3-methylaniline HCl _____ 2
Water to make one liter.

The soluble dye image formed in the magenta layer diffused to the mordant-containing layers to give mordant magenta dye images of increased stability to light and heat when compared to non-diffusible magenta dyes derived from organic solvent soluble couplers, such as 1 - (p - tert - butylphenoxyphenyl) - 3 - [α - (p - tert-butylphenoxy)propionamido]-5-pyrazolone and others disclosed, for example, in Porter U.S. Patent 2,369,489, issued February 13, 1945. Organic solvent soluble cyan and yellow couplers can also be replaced with respective cyan and yellow image transfer couplers in a multilayer element of the type described in this example using appropriate mordant layers to fix the soluble dyes formed during development.

Thus, mordanting compositions having particular utility in preparing color photographic products result when cationic mordant compounds are dissolved in high-boiling solvents and the solvents are dispersed in small droplets in hydrophilic colloids. Such mordanting compositions have been demonstrated to have utility for mordanting water-soluble acid dyes. Dyes mordanted in accordance with the invention have excellent heat and light stability.

This invention has been described in detail with particular reference to preferred embodiments thereof, but it will be understood that variations and modifications can be effected within the spirit and scope of the invention as described hereinabove and as defined in the appended claims.

I claim:

1. In a photographic process for mordanting an acid dye image, the improvement which comprises mordanting said dye image in a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant being selected from the group consisting of compounds having the formulas

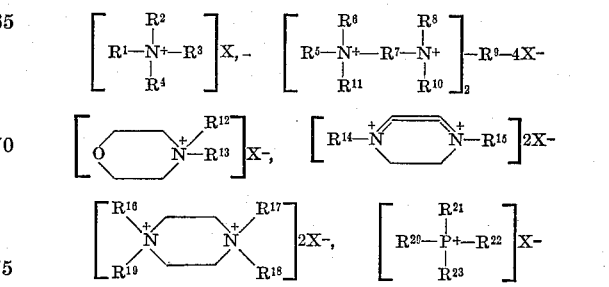

and

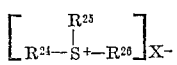

wherein:
A. $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$, and $R^{25}$ are alkyl radicals,
B. $R^3$ is selected from the group consisting of
 (1) an amino radical,
 (2) an alkyl radical, and
 (3) a cyclohexyl radical,
C. $R^4$, $R^{12}$, $R^{13}$, $R^{23}$ and $R^{26}$ are selected from the group consisting of
 (1) an alkyl radical, and
 (2) a cyclohexyl radical,
D. X is an acid anion, and
E. $R^7$ and $R^9$ are alkylene radicals;

said mordant being ballasted with at least one substituent having at least 8 carbon atoms.

2. In a photographic process for mordanting an acid dye image, the improvement which comprises mordanting said dye image in a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

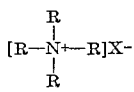

wherein R is an alkyl radical and X is an acid anion, at least one R having at least 8 carbon atoms.

3. A process as described in claim 2 wherein the mordant is methyl tri-n-laurylammonium p-toluenesulfonate.

4. A process as described in claim 2 wherein the mordant is N,N-dimethyl-N-(β-hydroxyethyl)-N-(γ-stearamidopropyl)ammonium dihydrogen phosphate.

5. In a photographic process for mordanting an acid dye image, the improvement which comprises mordanting said dye image in a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

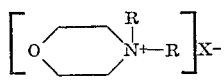

wherein R is an alkyl radical and X is an acid anion, at least one R having at least 8 carbon atoms.

6. A process as described in claim 5 wherein the mordant is N-cetyl-N-ethylmorpholinium p-ethosulfate.

7. In a photographic process for mordanting an acid dye image, the improvement which comprises mordanting said dye image in a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

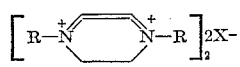

wherein R is an alkyl radical and X is an acid anion, at least one R having at least 8 carbon atoms.

8. A process as described in claim 7 wherein the mordant is 1,4-dihexadecyl-1,4-diazabicyclo[2.2.2]octanium dichloride.

9. In a photographic process for mordanting an acid dye image, the improvement which comprises mordanting said dye image in a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

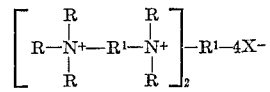

wherein R is an alkyl radical, $R^1$ is an alkylene radical and X is an acid anion, at least one of R and $R^1$ having at least 8 carbon atoms.

10. A process as described in claim 9 wherein the mordant is 17,17,20,20,31,31,34,34-octamethyl-17,20,31,34-tetrazapentacontaniumtetrabromide.

11. In a photographic color diffusion transfer process wherein an acid dye is transferred imagewise by diffusion to a mordanting reception layer, the improvement which comprises utilizing as said reception layer a layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for said acid dye at a ratio of said mordant to said solvent of about 1/.25 to 1/2 by weight, said mordant being selected from the group consisting of compounds having the formula

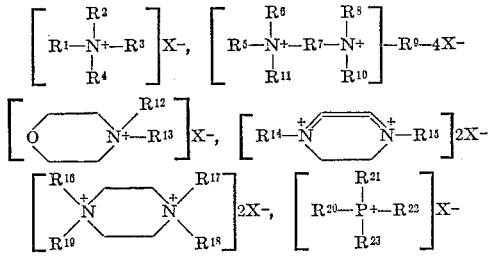

and

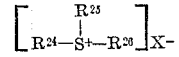

wherein:
A. $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$, and $R^{25}$ are alkyl radicals,
B. $R^3$ is selected from the group consisting of
 (1) an amino radical,
 (2) an alkyl radical, and
 (3) a cyclohexyl radical,
C. $R^4$, $R^{12}$, $R^{13}$, $R^{23}$ and $R^{26}$ are selected from the group consisting of
 (1) an alkyl radical, and
 (2) a cyclohexyl radical,
D. X is an acid anion, and
E. $R^7$ and $R^9$ are alkylene radicals;

said mordant being ballasted with at least one substituent having at least 8 carbon atoms.

12. A photographic process as described in claim 11 wherein a solvent for the mordant selected from the group consisting of
 (1) a water-soluble organic solvent, and
 (2) a substantially water-insoluble organic solvent having a boiling point at least about 25° C. below the boiling point of the solvent boiling above about 175° C.

is used as an auxiliary solvent with the solvent boiling above about 175° C.

13. A process as described in claim 11 wherein the solvent boiling above about 175° C. is selected from the group consisting of an organic carboxylic acid ester and an organic phosphate ester.

14. In a photographic color diffusion transfer process wherein an acid dye is transferred imagewise by diffusion to a mordanting reception layer, the improvement which comprises utilizing as said reception layer a layer comprising gelatin containing substantially uniformly dispersed therein finely divided droplets of a crystalloidal, water-immiscible, organic solvent boiling above about 175° C. containing dissolved therein a nonpolymeric organic cationic mordant for said acid dye at a ratio of said mordant to said solvent of about 1/.25 to 1/2 by weight, said mordant being selected from the group consisting of (1) Octadecyltri-n-butylammonium bromide,
(2) Tetradecyltri-n-butylammonium bromide,
(3) Octadecyltri-n-octylammonium bromide,
(4) Octadecyltri-n-decylammonium bromide,
(5) Methyltri-n-laurylammonium p-toluenesulfonate,
(6) Methyltri-n-decylammonium p-toluenesulfonate,
(7) Tetra-n-octylammonium bromide,
(8) Tetra-n-decylammonium bromide,
(9) Tetra-n-laurylammonium bromide,
(10) N,N-dimethyl-N-($\beta$-hydroxyethyl)-N-($\gamma$-stearamidopropyl)ammonium dihydrogen phosphate,
(11) N,N-dimethyl-N-($\beta$-hydroxyethyl)-($\gamma$-stearoyloxypropyl)ammonium chloride,
(12) N,N-dimethyl-N-($\beta$-hydroxyethyl)-N-(p-tert-octylphenoxydiethoxyethyl)ammonium methosulfonate,
(13) N,N-dimethyl-N-($\beta$-hydroxyethyl)-N-(p-tert-octylphenoxytetraethoxyethyl)ammonium methosulfonate,
(14) N,N-dimethyl-N-($\beta$-hydroxyethyl)-N-(N-methyl-$\gamma$-stearamidopropyl)ammonium bromide,
(15) Cetyltrimethylammonium bromide,
(16) 17,17,20,20,31,31,34,34-octamethyl-17,20,31,34-tetrazapentacontaniumtetrabromide,
(17) 1,4-dihexadecyl-1,4-diazabicyclo[2.2.2]octanium dichloride,
(18) 1,4-didodecyl-1,4-diazabicyclo[2.2.2]octanium p-toluene sulfonate,
(19) 1,4-bis[$\gamma$-(2,4-di-tert-amylphenoxy)butyl]-1,4-diazabicyclo[2.2.2]octanium chloride,
(20) 1,4-di-n-hexadecyl-1,4-diazabicyclo[2.2.2]octanium dithiocyanate,
(21) 1,4-di-n-decyl-1,4-diazabicyclo[2.2.2]octanium perchlorate,
(22) 1,10-decamethylenenbis(4-lauryl-1,4-diazabicyclo[2.2.2]octanium)tetrabromide,
(23) n-Octadecyltri-n-butylphosphonium bromide,
(24) n-Hexadecyltriphenylphosphonium bromide,
(25) 5,5,7,7-tetramethyl-2-octenyltri-n-butylphosphonium chloride,
(26) 1-(3,5-dioxo-6-4-aza)tetracosyltri-n-butylphosphonium bromide,
(27) 1,1-dimethyl-1-(n-hexadecyl)hydrazonium perchlorate,
(28) 1,1-dimethyl-1-($\gamma$-stearamidopropyl)hydrazonium chloride,
(29) N-cetyl-N-ethylmorpholinium p-ethosulfate,
(30) N-methyl-N-myristyloxymethylmorpholinium p-toluenesulfonate,
(31) 1,4-dimethyl-1,4-di-n-laurylpiperazinium dibromide,
(32) S-n-butyl-S-methyl-S-n-octadecylsulfonium p-toluenesulfonate,
(33) S-ethyl-S-methyl-S-($\gamma$-stearoyloxypropyl)sulfonium p-toluenesulfonate,
(34) S,S-di-n-lauryl-S-methylsulfonium thiocyanate,
(35) N,N-dimethyl-N-($\beta$-dimethylaminoethyl)-N-(n-hexadecyl)ammonium bromide,
(36) Hexadecyltri-n-butylphosphonium bromide,
(37) N-dodecyl-N-methylmorpholinium chloride,
(38) N-methyl-N-octadecyloxymethylmorpholinium p-toluenesulfonate,
(39) Methyltri-n-laurylammonium chloride,
(40) n-Octadecyl-dimethyl-$\beta$-hydroxyethyl ammonium bromide,
(41) Sec.-butyl-1,4-diazabicyclo[2.2.2]octanium dibromide, and
(42) N-cyclohexy-N-N-dimethyl-N-(dodecylthiomethyl)ammonium p-toluenesulfonate.

15. A photographic element comprising a photographic support having coated thereon a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant being selected from the group consisting of compounds having the formulas

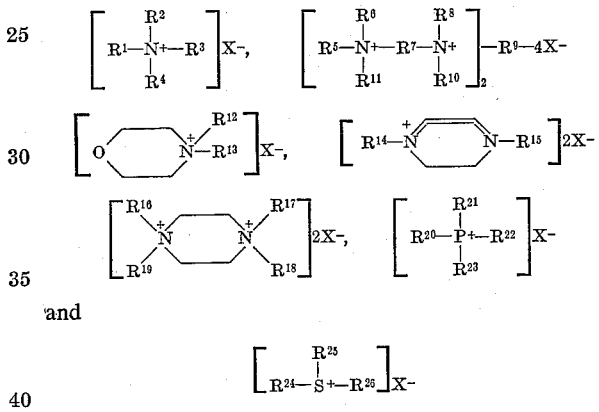

and $$\left[ R^{24} - \overset{R^{25}}{\underset{}{S^+}} - R^{26} \right] X^-$$

wherein:
A. $R^1$, $R^2$, $R^5$, $R^6$, $R^8$, $R^{10}$, $R^{11}$, $R^{14}$, $R^{15}$, $R^{16}$, $R^{17}$, $R^{18}$, $R^{19}$, $R^{20}$, $R^{21}$, $R^{22}$, $R^{24}$ and $R^{25}$ are alkyl radicals,
B. $R^3$ is selected from the group consisting of
   (1) an amino radical,
   (2) an alkyl radical, and
   (3) a cyclohexyl radical,
C. $R^4$, $R^{12}$, $R^{13}$, $R^{23}$ and $R^{26}$ are selected from the group consisting of
   (1) an alkyl radical, and
   (2) a cyclohexyl radical,
D. X is an acid anion, and
E. $R^7$ and $R^9$ are alkylene radicals;
said mordant being ballasted with at least one substituent having at least 8 carbon atoms.

16. A photographic element as described in claim 15 wherein a solvent for the mordant selected from the group consisting of
   (1) a water-soluble organic solvent, and
   (2) a substantially water-insoluble organic solvent having a boiling point at least about 25° C. below the boiling point of the solvent above about 175° C. is used as an auxiliary solvent with the solvent boiling above about 175° C.

17. A photographic element as described in claim 15 wherein the solvent boiling above about 175° C. is selected from the group consisting of an organic carboxylic acid ester and an organic phosphate ester.

18. A photographic element comprising a photographic support having coated thereon a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

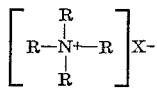

wherein R is an alkyl radical and X is an acid anion, at least one R having at least 8 carbon atoms.

19. A photographic element comprising a photographic support having coated thereon a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

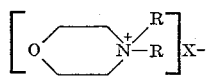

wherein R is an alkyl radical and X is an acid anion, at least one R having at least 8 carbon atoms.

20. A photographic support comprising a photographic support having coated thereon a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

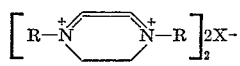

wherein R is an alkyl radical and X is an acid anion, at least one R having at least 8 carbon atoms.

21. A photographic element comprising a photographic support having coated thereon a mordanting layer comprising a hydrophilic organic colloid containing substantially uniformly dispersed therein finely divided droplets of a crystalloidal, water-immiscible, organic solvent boiling above about 175° C. containing dissolved therein a nonpolymeric organic cationic mordant for acid dyes at a ratio of said mordant to said solvent of about 1/.25 to 1/2 by weight, said mordant having the formula

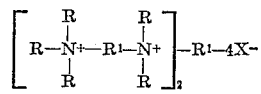

wherein R is an alkyl radical, $R^1$ is an alkylene radical and X is an acid anion, at least one of R and $R^1$ having at least 8 carbon atoms.

22. A photographic element comprising a photographic support having coated thereon a mordanting layer comprising a hydrophilic organic colloid containing substantially uniformly dispersed therein finely divided droplets of a crystalloidal, water-immiscible, organic solvent boiling above about 175° C. containing dissolved therein a mixture of nonpolymeric organic cationic mordants for acid dyes of
(1) at least one mordant selected from the group consisting of
(a) N,N-dimethyl-N-(β - hydroxyethyl) - N-(γ-stearamidopropyl)ammonium dihydrogen phosphate,
(b) Methyl tri-n-laurylammonium p-toluenesulfonate,
(c) 1,4-dihexadecyl - 1,4 - diazabicyclo[2.2.2]octanium dichloride,
(d) 17,17,20,20,31,31,34,34 - octamethyl - 17,20, 31,34-tetrazapentacontanium tetrabromide, and
(e) N-cetyl-N - ethylmorpholinium ethosulfate; and
(2) at least one mordant selected from the group consisting of
(a) octadecyl-tri-n-butylammonium bromide,
(b) octadecyl-tri-n-butylphosphonium bromide, and
(c) S,S,-di-n-lauryl - S - methylsulfonium thiocyanate;
the ratio of said mordants to said solvent being about 1/.25 to 1/2 by weight.

References Cited by the Examiner

UNITED STATES PATENTS

| | | | |
|---|---|---|---|
| 1,981,292 | 11/1934 | Todd et al. | 106—135 |
| 2,482,917 | 9/1949 | Kaplan | 106—135 |
| 2,852,382 | 9/1958 | Illingsworth et al. | 96—97 |
| 2,868,077 | 1/1959 | Ryan | 88—65 |
| 3,065,074 | 11/1962 | Rogers | 96—29 |
| 3,148,062 | 9/1964 | Whitmore et al. | 96—97 |
| 3,201,254 | 8/1965 | Reynolds et al. | 96—107 |

FOREIGN PATENTS 607,420  8/1961  Belgium.

NORMAN G. TORCHIN, *Primary Examiner.*

G. H. BJORGE, J. T. BROWN, *Assistant Examiners.*